2,866,297

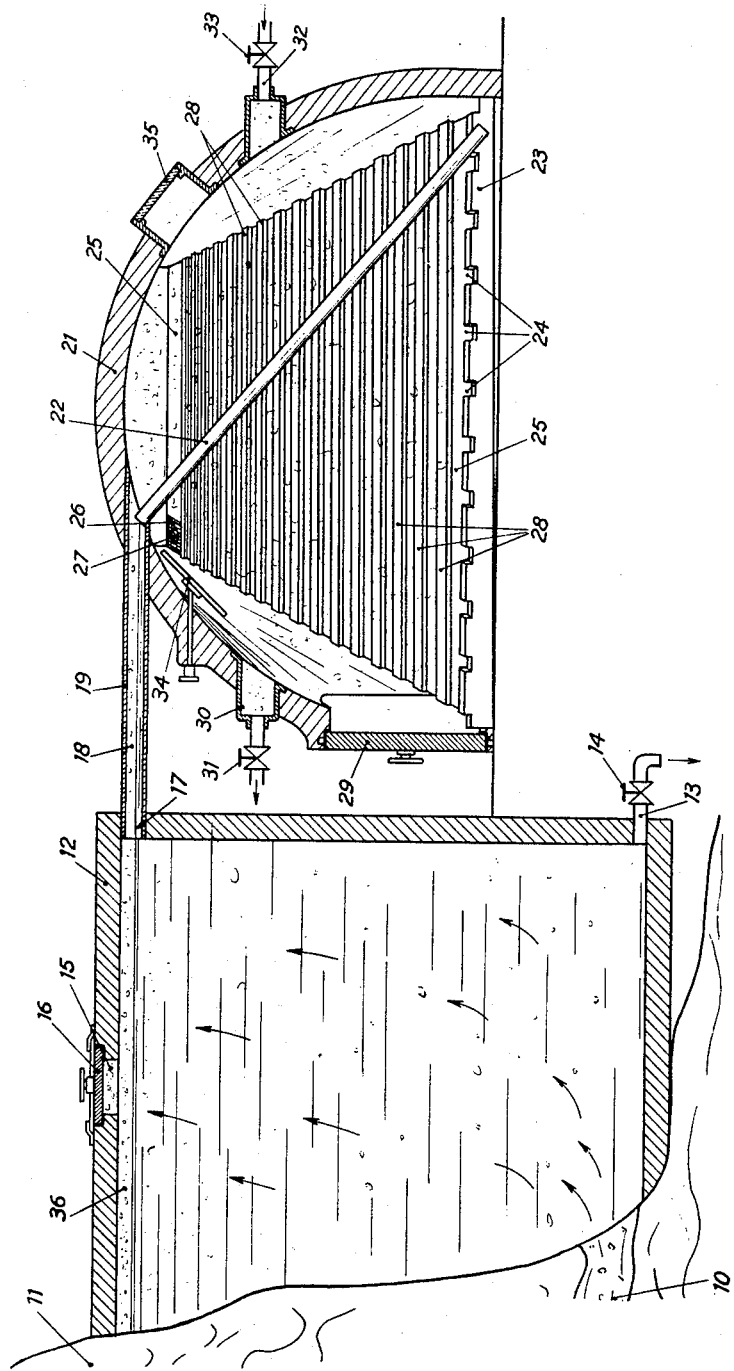

PROCESS AND INSTALLATION FOR THE COLLECTION, ACTIVATION, AND CULTURE OF PLANKTONIC COMPLEXES CONTAINED IN MINERAL WATERS

Georges Marissal, Nice, France

Application September 9, 1957, Serial No. 682,694

Claims priority, application France September 21, 1956

2 Claims. (Cl. 47—58)

It is known that mineral waters and particularly those from sulphur springs, contain various micro-organisms which, once they are collected, constitute a true plankton. It has been found that this plankton has vitalizing and even ionizing properties which it has already been suggested should be turned to advantage for various cosmetic, dietetic and, if necessary, dermatological uses.

Nevertheless, it has been recognized that said plankton, when simply cultivated and collected, has only a relatively moderate activity and the object of the present invention is the preparation of planktonic complexes which are much more active and which have fixed, in a much higher proportion, the vitalizing organic substances and the ionizing or radioactive mineral substances contained in the mineral water at the spring.

For this purpose the invention provides a process for the collection, activation and development of the above-mentioned planktonic complexes, consisting primarily in causing the mineral water to rest, protected from the air, at the outlet from the spring, in such a manner as to allow separation of the plankton to take place by floating and to expose said plankton to the combined activating actions of the mineral water situated below and of the natural gases released and accumulated above, and secondly in introducing, in a continuous manner, the water, the planktonic complex and the gases thus separated, into a closed chamber where a trickling takes place which is favourable to the development of the planktonic complex, possibly with exposure to the action of additional gases and suitable luminous radiation, and finally filtering and evacuation of the water.

An installation for carrying out the process according to the invention comprises a first closed tank communicating directly, at its base, with the source of the spring and comprising a drainage outlet and at the top a heat-insulated overflow leading into a closed chamber where the liquid is conveyed into an overflow collector, which is followed by a gently sloping floor provided with transverse members which the liquid has to pass over successively before reaching a damming filter and evacuation pipe, while the planktonic complexes activated by the long exposure to the water on the one hand and to the gases on the other hand are deposited and developed on the transverse members from which they are periodically scraped and gathered.

A preferred embodiment of an installation according to the invention is illustrated by way of example on the accompanying drawing.

On this drawing, there is seen at 10 and 11 a conventional illustration of the source of a mineral-water spring and of the rock which contains it.

On the side of this rock 11 there is built a closed tank 12, the lower portion of which is in direct communication with the source 10 of the spring. At the bottom of said tank, but opposite the source, there is provided a draining pipe 13 controlled by a valve 14.

At the top of the tank there is provided first of all a central inspection aperture 15, closed in a sealed manner by a cover 16; moreover, the tank comprises laterally an overflow sill 17 continued by a conduit 18 forming an overflow and protected externally by a layer of heat-insulating material 19.

The heat-insulated overflow leads to the top of a domed and closed chamber 21 in which a conduit 22 connects the overflow 18 to a collector 23 forming a crenellated trough extending transversely at the bottom of one end of the chamber 21.

The crenels, such as 24, in the collector 23 open onto a gently sloping floor 25 (illustrated in perspective on the drawing) occupying the whole area of the chamber and leading, at the other end thereof, to a filter 26 and an evacuation pipe 27.

Arranged parallel and transversely on the floor 25, is a large number of transverse members 28, simply held in suitable recesses in such a manner as to be easily removable.

The collector 23, the floor 25 and the transverse members 28 may be made of wood, or plastic material or the equivalent, but in no circumstances should any metal substance, even if it is stainless, be used in the construction of these members.

The chamber 21 is completed by an inspection door 29, a pipe 30 controlled by a valve 31, for the outlet of gases, a pipe 32 for the introduction of air, oxygen or other gases, controlled by a valve 33, a thermostat 34 for the admission and control of the temperature inside the chamber and finally a certain number of portholes such as 35 behind which sources of suitable luminous radiations are arranged.

The method of using the installation which has just been described coincides exactly with carrying out the process according to the invention.

The mineral water coming from the source 10 of the spring fills the tank 12 up to the level of the overflow sill 17. Because of the large section of the tank, the speed of the current is low and the water is in relative repose. As a result of its natural tendency, the plankton contained in the water rises to the surface of the water and this rise is further encouraged by the release of the gases which were dissolved in the mineral water. These gases collect at 36 in the upper part of the tank.

Three phases are thus obtained: mineral water, plankton and natural gases. Thus enclosed, the plankton fixes, either by combination or by adsorption, the vitalizing, ionizing and radio-active substances with which it is in contact and is thus subjected to a considerable activation.

According to the output of the spring, it is decided whether a fraction of the mineral water should be evacuated through the pipe 13 and the valve 14 is regulated accordingly. The rest, or all the mineral water, as the case may be, leaves the tank 12 by overflowing over the sill 17, taking with it the plankton which has accumulated on the surface; this mixture enters the overflow pipe 18, the cross-sectional area of which is sufficient to afford passage not only to the water and the plankton, but also to the natural gases which are continuously released. Here again, therefore, there is the formation of three phases mentioned above and the activation of the plankton continues. This plankton, thus associated with the environmental energies constitutes a real thermo-mineral planktonic complex, the production of which represents one of the characteristic principles of the invention.

As soon as they enter the chamber 21, the water and the planktonic complex are collected by the conduit 22 and conveyed in the collector 23 to the high portion of the sloping floor 25. As for the natural gases introduced through the overflow pipe 18, they spread over the whole interior of the chamber.

It should be noted that the overflow pipe 18, which is carefully insulated by the heat-insulation 19, does not cause any noticeable cooling of the substances which pass through it so that the activation of the planktonic complex takes place under the optimum conditions.

The mixture of water and planktonic complex received by the collector 23 escapes slowly through the crenels 24 and spreads over the floor 25 where the transverse members 28 retain the planktonic complex; the remaining water finally reaches the filter 26 which stops the last planktonic particles while the water from which all the active principles have been extracted is evacuated naturally through the pipe 27.

In the chamber 21 there prevails a suitable temperature which is controlled by the thermostat 34 and which is generally maintained at the value which the water has in the source 10.

The atmosphere of the chamber 22 consists primarily of the natural gases from the spring, although it is possible to introduce through the pipe 32 either air, which has been suitably purified and aseptified, or oxygen, or any other gas or mixture of gases. In order to maintain the most suitable pressure in the chamber, the valve 31 of the pipe 30 is regulated in such a manner as to afford the required evacuation flow of the gases.

Finally, by means of the window 35, it is possible to subject the interior of the chamber to any suitable luminous radiation which may, incidentally be indirect sunlight, suitably attenuated or filtered.

All the necessary physical conditions having thus been obtained, the planktonic complex deposited on the transverse members can proliferate and develop while continuing to absorb all the active and energizing substances continuously supplied by the mineral water and the natural gases which bathe said complex.

Finally, when the production of planktonic complex is considered to be sufficient, the supply of mineral water is stopped and the staff to whom the gathering is entrusted enter the chamber through the door 29 and take down each transverse member 28, scrape it and collect the planktonic complex in a sterilized receptacle which is immediately stoppered and supplied to the place where it is to be utilized.

The gathering is followed by a general aseptifying of the chamber 21, for example by means of formol vapour maintained for twelve hours, then evacuated and after rapid rinsing with mineral water the installation may be started up again for a fresh gathering of the planktonic complex.

The composition and properties of the planktonic complex obviously vary with each mineral spring at which the process according to the invention is applied, but in each case, one can be certain that the planktonic complex formed will have fixed the maximum activity compatible with the characteristics of the spring.

It is understood that the example and installation which have just been described in no way limit the invention and that numerous modifications may be made to the details of said installation without going outside the general scope of this invention.

I claim:

1. A process for the collection, activation and culture of the planktonic complexes contained in mineral spring waters, consisting in causing the mineral water to rest, sheltered from the air, as soon as it leaves the source of the spring, in such a manner as to allow separation of the plankton by floating to take place and in exposing this to the combined activating actions of the mineral water situated below and of the natural gases situated above, and secondly in introducing continuously the water, the planktonic complex and the natural gases thus separated, into a closed chamber where a slow trickling takes place suitable for the development of the planktonic complex, if necessary with subjection to the action of additional gases and suitable luminous radiation, and finally filtering and evacuation of the water.

2. An installation for carrying out the process according to claim 1 comprising a closed tank communicating directly at its base with the source of the spring and comprising a draining outlet and, at the top, a heat-insulated overflow pipe leading into a closed chamber where the liquid is conveyed into an overflowing collector which is followed by a gently sloping floor provided with transverse members over which the liquid has to pass successively before reaching a damming filter and an evacuation pipe; said chamber being equipped with means for introducing additional gases and for producing suitable luminous radiation.

References Cited in the file of this patent

"Algal Culture" (Burlew), published by Carnegie Institution of Washington (D. C.), 1953, as their Publication 600. Pages 190 through 196 are relied on.